United States Patent
Duale et al.

(10) Patent No.: US 7,877,742 B2
(45) Date of Patent: Jan. 25, 2011

(54) METHOD, SYSTEM, AND COMPUTER PROGRAM PRODUCT TO GENERATE TEST INSTRUCTION STREAMS WHILE GUARANTEEING LOOP TERMINATION

(75) Inventors: Ali Y. Duale, Poughkeepsie, NY (US); Theodore J. Bohizic, Hyde Park, NY (US); Dennis W. Wittig, New Paltz, NY (US)

(73) Assignee: International Business Machines Corporation, Armonk, NY (US)

(*) Notice: Subject to any disclaimer, the term of this patent is extended or adjusted under 35 U.S.C. 154(b) by 1236 days.

(21) Appl. No.: 11/449,318

(22) Filed: Jun. 8, 2006

(65) Prior Publication Data

US 2006/0230392 A1 Oct. 12, 2006

Related U.S. Application Data

(63) Continuation of application No. 10/183,865, filed on Jun. 27, 2002, now abandoned.

(51) Int. Cl.
G06F 9/45 (2006.01)
G06F 9/44 (2006.01)

(52) U.S. Cl. .................. 717/150; 717/158; 717/130; 717/134; 717/124

(58) Field of Classification Search .............. 717/150, 717/158, 130, 134, 124
See application file for complete search history.

(56) References Cited

U.S. PATENT DOCUMENTS

| | | | |
|---|---|---|---|
| 5,237,536 A * | 8/1993 | Ohtsuki ............... | 365/230.06 |
| 5,303,355 A * | 4/1994 | Gergen et al. ............... | 712/241 |
| 5,506,976 A * | 4/1996 | Jaggar ........................ | 712/238 |
| 5,646,974 A | 7/1997 | Wu et al. ...................... | 377/15 |
| 5,909,573 A * | 6/1999 | Sheaffer ..................... | 712/240 |
| 5,956,478 A * | 9/1999 | Huggins ...................... | 714/33 |
| 6,003,128 A * | 12/1999 | Tran ........................... | 712/241 |
| 6,145,076 A * | 11/2000 | Gabzdyl et al. ............. | 712/241 |
| 6,380,730 B1 * | 4/2002 | Arkin et al. ............... | 324/158.1 |
| 6,401,196 B1 * | 6/2002 | Lee et al. ..................... | 712/241 |

OTHER PUBLICATIONS

Glenstrup, et al. "Termination Analysis and Specialization-Point Insertion in Offline Partial Evaluation", 2005, ACM, p. 1147-1215.*

(Continued)

*Primary Examiner*—Wei Y Zhen
*Assistant Examiner*—Qamrun Nahar
(74) *Attorney, Agent, or Firm*—Dennis Jung; Garry Monteleone

(57) ABSTRACT

A method, system, and computer program product for generating terminating, pseudo-random test instruction streams, including forward and backward branching instructions. A first instruction stream is generated, including at least one backward branching instruction and at least one forward branching instruction. Each backward branching instruction is preceded by at least one forward branching instruction, which is used to guarantee termination of the loop formed by the backward branching instruction. Backward branching targets are resolved when the backward branching instruction is inserted into the first instruction stream. Forward branching targets remain unresolved in the first instruction stream. A set of potential branch targets is determined for each forward branching instruction. For each forward branching instruction, a branch target is randomly selected from the set of potential branch targets for that forward branching instruction. The final terminating instruction stream consists of the first stream, with all forward branch targets resolved.

20 Claims, 6 Drawing Sheets

OTHER PUBLICATIONS

"Generation of Design Verification Tests from Behavioral VHDL Programs Using Path Enumeration and Contraint Programming", by Vemuri et al, IEEE Transactions On Very Large Scale Integration (VLSI) Systems, vol. 3, No. 2, Jun. 1995, pp. 201-214.

"Bounding Loop Iterations for Timing Analysis" by Healy et al, Proceedings of Technology and Application Symposium, 1998, pp. 12-21.

"Compile-Time and Runtime Analysis of Active Behaviors" by E. Baralis et al, IEEE Transactions on Knowledge and Data Engineering, vol. 10, No. 3, May/Jun. 1998, pp. 353-370.

"Software Specialization Via Symbolic Execution" by A. Coen-Porisini et al, IEEE Transactions On Software Engineering, vol. 17, No. 9, Sep. 1991, pp. 884-899.

* cited by examiner

METHOD, SYSTEM, AND COMPUTER PROGRAM PRODUCT TO GENERATE TEST INSTRUCTION STREAMS WHILE GUARANTEEING LOOP TERMINATION

This application is a continuation of U.S. patent application Ser. No. 10/183,865 which was filed on Jun. 27, 2002 now abandoned, the entirety of which is incorporated herein by reference.

FIELD OF THE INVENTION

The present invention relates in general to the generation of instruction streams used in computer system testing. In particular, the present invention relates to a method of generating a terminating random instruction stream usable in testing a computer system, where the instruction stream includes at least one backward branching instruction.

BACKGROUND OF THE INVENTION

As is known, computer systems are tested to verify that the systems are compliant with their intended architecture. Compliance may be verified, for example, by stimulating the computer system with various sets of valid inputs, typically consisting of machine instructions and interrupts (internal and/or external). Modern computer systems are typically complex, and may be capable of handling many different instructions and interrupts. It is often difficult to determine a priori precisely which instructions within a particular system's instruction set are most likely to exhibit noncompliance: for this reason, randomly generated, biased instruction streams are often used as an effective and efficient way to reveal system compliance errors. In practice, pseudo-random instruction streams are often used, typically generated by using an initial or "seed" value and an instruction selection algorithm (or test generation program) which uses the seed as an input. As used herein, "random" and "pseudo-random" are used interchangeably. Furthermore, in order to utilize the knowledge and experience of system architects and test engineers regarding the machine instructions which may be of greatest concern, a set of instruction biases may be used, providing guidance to the test generation algorithm as to the relative frequency with which each instruction should be used in the resulting instruction stream. An instruction stream generated in accordance with a set of biases is referred to as a biased instruction stream. To enable the greatest possible test coverage of the instruction set, and therefore the greatest possible probability of error detection, all instruction types should be available for inclusion in a test instruction stream. In particular, both forward branching and backward branching instructions should be available for inclusion within a test instruction stream.

A randomly generated, biased instruction stream should constitute a terminating computer program, in order to maximize test efficiency. Each set of machine instructions comprising a randomly generated, biased instruction stream includes, in general, operands, addresses, and the sequence in which the instructions are executed: each such instruction stream is, therefore, a computer program. While the instruction syntax should be correct, the semantics of the resulting computer program is not generally relevant from a test viewpoint. However, unless appropriate control mechanisms are used, a randomly generated instruction stream in which all instruction types may be used, could form a non-terminating instruction stream (i.e., a non-terminating program). A non-terminating test instruction stream may drastically reduce the efficiency of testing, by causing the computer system to repeatedly execute only a portion of the intended test instruction stream.

A computer program comprising a randomly selected stream of instructions is unlikely to simultaneously achieve both high test coverage, and termination. As previously noted, inclusion of forward branching and backward branching instructions in a test instruction stream is desirable, from a test coverage viewpoint. Inclusion of these instruction types, however, may result in loops or recursions within the computer program or instruction stream. Programs including loops or recursions are not, in general, guaranteed to terminate. Determining whether or not a program terminates, when the program contains loops or recursions, is related to the well-known "halting problem," for which there is, in general, no particular solution. There are, for example, real-life programs which are designed to run forever. Typically, a terminating loop includes three essential loop components: an initialization, one or more controlling conditions, and one or more iteration incrementing statements. A loop in a program or instruction stream generated by a random generation algorithm, however, may lack one or more of these essential loop components, such as a proper iteration incrementing statement. As a result, a randomly generated instruction stream containing one or more branching instructions may, in general, never terminate. Several methods are known in the art to detect non-terminating loops in computer programs or instruction streams in general. For example, methods such as loop invariant analysis, loop unfolding, and data flow graphs may be used to determine whether or not a specific computer program is likely to terminate within a finite number of iterations.

Loop invariant analysis may be used to determine whether a particular computer program is likely to terminate. A loop invariant is an expression which shows the progress that successive iterations of the loop make toward satisfying the exit condition(s) of the loop. Thus, the invariant of the loop is directly related to the loop exit condition expression. For the loop to terminate after a finite number of iterations, at least one variable of its exit condition expression must change its value within the loop. In addition, these changes must lead toward the loop exit condition. In contrast, a loop invariant expression in which none of the loop variables changes value indicates a loop which does not terminate, or which cannot be executed. While loop invariant analysis may detect non-terminating loops, identifying the loop invariant is often not a straightforward process, and frequently requires human interaction and analysis.

Loop unfolding may also be used to determine whether a particular computer program is likely to terminate. Loop unfolding is discussed in, for example, R. Vemuri and R. Kalyanaraman, "Generation of Design Verification Tests from Behavioral VHDL Programs using Path Enumeration and Constraint Programming," *IEEE Transactions on VLSI Systems*, vol. 3, No. 2, June 1995, pp. 201-214. According to the loop unfolding method, a loop is replaced with a sequence of if-then-else constructs. Statements in the loop body are copied within the new constructs. Each time a new if-then-else construct is created, the exit condition is checked. Depending upon the exit condition status, the loop is either found to be terminating or further loop unfolding is performed. The loop unfolding process is continued until either the loop is found to be terminating, or an iteration threshold is reached in which case the loop is considered potentially non-terminating. While loop unfolding may also detect non-terminating loops, the process is also time consuming and likely to require some analysis such as finding loop upper bounds.

Directed acyclic graphs (DAGs) may also be used to determine whether a particular computer program is likely to terminate. Directed acyclic graphs are discussed in, for example, C. Healy, et. al., "Bounding Loop Iterations for Timing Analysis," *Proceedings of Technology and Application* Symposium, 1998, pp. 12-21. The DAG method predicts the execution time of natural loops (i.e., loops with single entries) whose iterations depend upon counter variables. A DAG representing the loop is constructed. The nodes of the DAG consist of condition and continue branches, as well as break nodes. The continue and break nodes signify the back edges and transitions out of the loop, respectively. Conditional branches which affect the loop iterations, termed iteration branches, are identified. A table is constructed containing relevant information for each iteration branch, such as variable values before and after the branch is traversed. An iteration branch is classified as known if the pertinent information in the table is completed. The number of times a branch can be taken is derived from the table. For the case when the iteration is unknown, the maximum range is assigned to each outgoing edge of the node. The maximum and minimum iteration of the root node of the DAG become the maximum and minimum iterations of the loop, respectively. Further work is needed to handle cases where loops are nested and when the counters are incremented in a variable manner.

The above methods are intended for use in analyzing computer programs in general, and share a number of common attributes that may be unnecessary and/or undesirable within the more specific realm of test program generation. In particular, as previously noted, within the field of test program generation, test program semantics are not a consideration, in contrast with computer program generation in general. The methods described, therefore, focus on determining whether a specific instruction set is likely to terminate, rather than on modifying or influencing the instruction stream to insure termination. Such modification could alter the program semantics, and may therefore be undesirable in general. Also, while some degree of human analysis and interaction may be desirable or necessary within the field of programming in general, test program generation is preferably performed in an automated environment. In the field of test generation, minimal post-generation analysis and modification is highly desirable.

U.S. Pat. No. 5,956,478 to Huggins, entitled "Method for Generating Random Test Cases Without Causing Infinite Loops," discloses a method of generating random test streams, including backward branching instructions. Non-terminating (or infinite) loops are prevented in two ways. First, creation of loops at the macroscopic level is prevented entirely, by segmenting the test instruction stream into blocks or instructions, and allowing no more than one branch path into each block of instructions. Second, each instruction group may contain one or more controlled (i.e., terminating) loops, such as those formed by a branch on count instruction.

For the foregoing reasons, therefore, there is a need in the art for a method of generating a random test instruction stream, including both forward and backward branching instructions, where the instruction stream is guaranteed to terminate.

SUMMARY

The present invention is directed to a method, system, and computer program product for guaranteeing the termination of test programs composed of randomly generated instruction streams, where the streams may include both forward and backward branching instructions. The methods of the present invention insure instruction stream termination by embedding appropriate loop components within the stream during generation of the instruction stream.

In particular, the present invention is directed to a method of generating a terminating instruction stream including at least one backward branching instruction, comprising the steps of generating a first instruction stream, where the first instruction stream includes at least one backward branching instruction and a plurality of loop components, where each of the at least one backward branching instructions is preceded by one or more of the plurality of loop components, where the loop components include one or more branch initialization instructions and one or more forward branching instructions; determining a set of target addresses for each of the one or more forward branching instructions, and producing a terminating instruction stream from the first instruction stream by selecting from the set of target addresses a target address for each forward branching instruction.

The present invention is further directed to a program storage device readable by a machine, tangibly embodying a method of generating a terminating instruction stream including at least one backward branching instruction, comprising the steps of generating a first instruction stream, where the first instruction stream includes at least one backward branching instruction and a plurality of loop components, where each of the at least one backward branching instructions is preceded by one or more of the plurality of loop components, where the loop components include one or more branch initialization instructions and one or more forward branching instructions; determining a set of target addresses for each of the one or more forward branching instructions, and producing a terminating instruction stream from the first instruction stream by selecting from the set of target addresses a target address for each forward branching instruction.

The present invention is further directed to a data processing system for generating a terminating instruction stream including at least one backward branching instruction, where the data processing system includes a memory, the memory containing program code for performing the steps of generating a first instruction stream, where the first instruction stream includes at least one backward branching instruction and a plurality of loop components, where each of the at least one backward branching instructions is preceded by one or more of the plurality of loop components, where the loop components include one or more branch initialization instructions and one or more forward branching instructions; determining a set of target addresses for each of the one or more forward branching instructions, and producing a terminating instruction stream from the first instruction stream by selecting from the set of target addresses a target address for each forward branching instruction.

It is therefore an object of the present invention to enable inclusion of both forward and backward branching instructions in a randomly generated instruction stream.

It is a further object of the present invention to guarantee termination of a randomly generated instruction stream including both forward and backward branching instructions.

It is yet a further object of the present invention to provide a method of generating terminating, random instruction streams including both forward and backward branching instructions, capable of being implemented by a machine.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
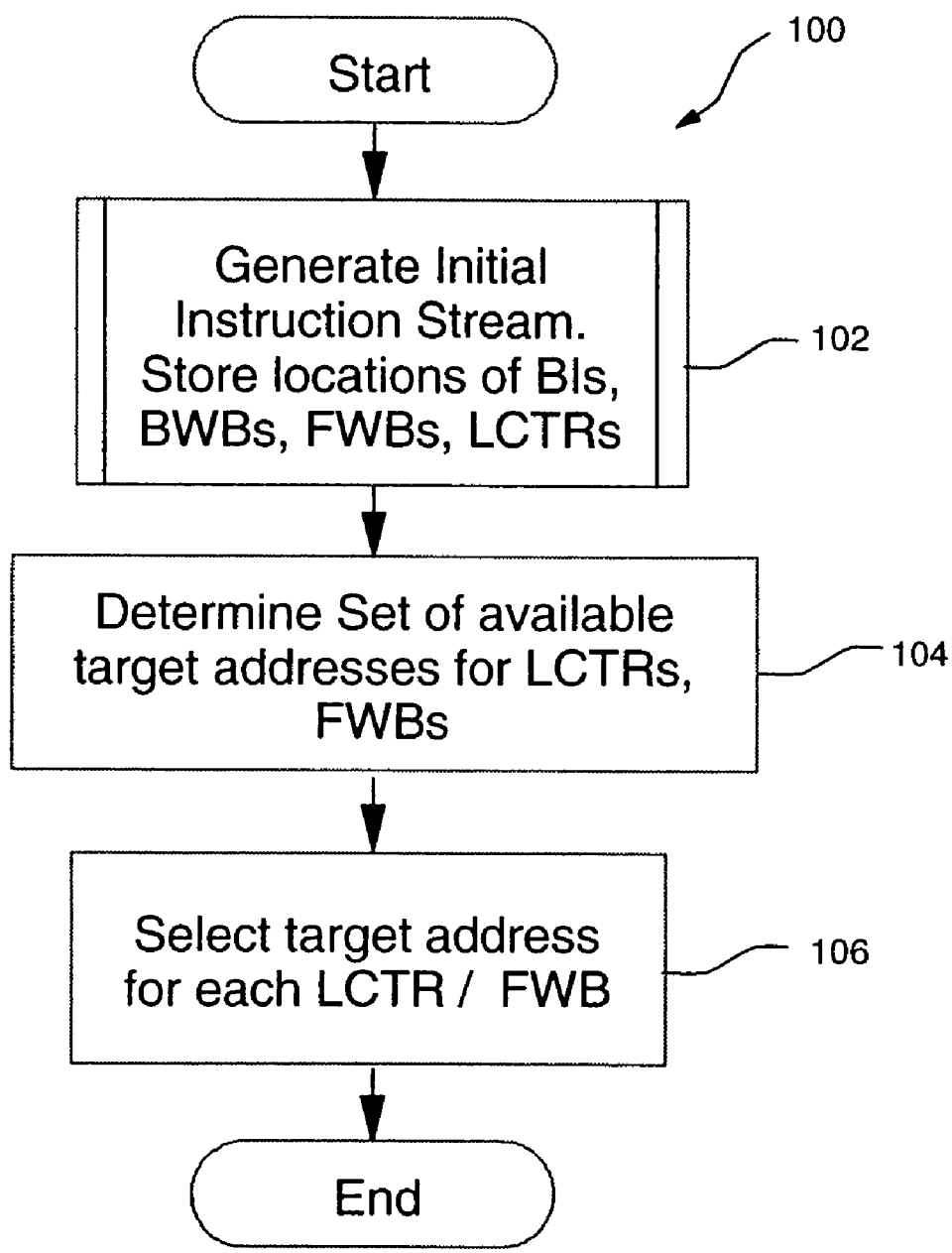
FIG. 1 illustrates a test generation method per an embodiment of the present invention.

In accordance with preferred embodiments of the present invention, a method, system, and computer program product are disclosed for guaranteeing the termination of test programs composed of randomly generated instruction streams, where the streams may include both forward and backward branching instructions. The methods of the present invention insure instruction stream termination by embedding appropriate loop component instructions, or loop components, within the stream during generation of the instruction stream, and by subsequently resolving the branch targets of all forward branching instructions to insure termination of all program loops. The methods presented herein generate a terminating instruction stream, without the need for further analysis. Randomly generated instruction streams generated in accordance with the methods of the present invention may be executed immediately after generation, without further analysis or modification.

As previously noted, in order to enable the greatest possible test coverage of a computer system's instruction set, and therefore the greatest possible probability of error detection, all instruction types should be available for inclusion in a test instruction stream. In particular, both forward branching and backward branching instructions should be available for inclusion within a test instruction stream. Instructions which change the sequence of instruction execution by determining the address of the next instruction to be executed are called branching instructions. Branching instructions may be classified as backward branching (BWB) or forward branching depending on whether the address of the next instruction to be executed precedes (BWB) or succeeds (forward branch), in execution sequence, the branching instruction. If, after executing a backward branch, the program counter increments and causes the same backward branching instruction to execute again, a loop is formed. In particular, branch instructions such as, for example, branch on condition, branch on count, branch on index high, or branch on index low or equal, may constitute BWBs, and may therefore create loops.

Loops formed by BWB instructions may be classified as controlled and uncontrolled. Controlled loops, in general, tend to terminate: BWB instructions such as branch on count form controlled loops, since the branch instruction can only be executed a finite number of times. Uncontrolled loops may or may not terminate: BWB instructions such as branch on condition, branch on index high/low form uncontrolled loops. From a test coverage viewpoint, it is desirable to have the capability of including all types of BWB instructions (branch on condition, as well as branch on count) within a randomly generated test instruction stream.

In order to guarantee that loops created in a randomly generated instruction stream terminate, the methods of the present invention impose a degree of structure upon the otherwise random instruction stream. As previously noted, there are generally three essential loop components of a terminating loop: an initialization, one or more controlling conditions, and one or more iteration incrementing statements. In a purely random instruction stream containing backward branching instructions, it is unlikely that each BWB will occur at a location within the instruction stream where each above described essential loop component exists. Furthermore, even if all essential loop components are present in a randomly generated stream, the loop components may not occur in the proper sequence to insure loop termination: for example, the initialization component may succeed the controlling conditions. Therefore, in order to insure loop termination within instruction streams containing one or more BWBs, structure is imposed upon the otherwise random instruction stream to insure that each loop includes an initialization, at least one controlling condition, and at least one iteration incrementing statement.

The methods of the present invention impose structure on the otherwise random instruction stream, by assuring that appropriate loop components are inserted into the stream to guarantee loop termination. As previously noted, a backward branching instruction (BWB) may create a loop. The methods of the present invention insure loop termination by providing, for each loop, a control variable and a series of instructions that operate on the control variable. The control variable is first initialized by a branch initialization (BI) instruction. The BI instruction is executed when a loop is first entered, and is not executed during subsequent loop iterations. The BI instruction is a loop component: it initializes the loop control variable. The methods of the present invention insure that the loop control variable is incremented and tested during each loop iteration. In this manner, each loop is guaranteed to contain all essential loop components. The test and increment functions may be performed by the backward branch (BWB), in the limited set of circumstances described herein with reference to FIG. 6. Under these circumstances, loop control is provided by BI and BWB instructions. In the most general case, such as when a backward branch on condition instruction creates a loop, the methods of the present invention insert an additional instruction into the instruction stream to increment and test the control variable. This instruction, referred to herein as a loop control instruction (LCTR), is a forward branching instruction that terminates a loop after a finite number of iterations. As used herein, loop components may be branch initialization (BI), loop control (LCTR), or backward branch (BWB) instructions. The methods of the present invention also provide for random insertion of other forward branching instructions that are unrelated to loop control. These randomly inserted forward branching instructions are therefore not within the definition of loop components, as the term is defined herein. Such randomly inserted forward branching instructions are herein referred to as FWBs. Two types of forward branching instructions are therefore discussed: forward branching instructions that are inserted into the stream to control loops (LCTRs), and randomly inserted forward branching instructions that are unrelated to loop control (FWBs).

In preferred embodiments of the present invention, the methods used to impose structure on the otherwise random instruction stream provide for a great degree of randomness, within the imposed structure. This is accomplished in two ways. First, preferred embodiments of the present invention provide a mechanism for including random streams of instructions between each of the loop components, while insuring that appropriate loop components are inserted into the stream to guarantee loop termination. Second, preferred embodiments of the present invention provide a set of potential branch targets for each forward branching (FWB) and loop control (LCTR) instruction, then randomly select the branch target for each FWB and LCTR from the set of potential branch targets.

FIG. 1 illustrates test generation process flow 100, per an embodiment of the present invention. At step 102, an initial instruction stream is generated, including at least one backward branching instruction (BWB). During step 102, appropriate loop components are inserted into the instruction stream. Loop components include branch initialization (BI), loop control instructions (LCTR), and backward branching instructions (BWB). In addition, other forward branching instructions (FWBs) may be randomly inserted into the instruction stream: since these instructions alter the flow of processing, and may therefore alter the effectiveness of the other loop components, the methods of the present invention also take into account randomly inserted FWBs.

Information related to the instruction stream generated in step 102 is used to determine the potential forward branching targets, step 104. In order to simultaneously insure loop termination while providing a degree of randomness, aspects of the instruction stream are left undefined during the initial instruction stream generation, step 102. In particular, determination of the target addresses of forward branching instructions (FWBs and LCTRs), some of which are intentionally inserted into the instruction stream in order to insure loop termination (LCTRs) and some of which may be randomly inserted (FWBs), may be deferred until the entire initial instruction stream is available. In preferred embodiments of the present invention, information relating to the type and location of each loop component or forward branch (BI, LCTR, BWB, and FWB) is determined and stored during initial stream generation 102. This information is subsequently used to determine the set of potential target addresses for each FWB and LCTR, step 104. In step 104, a set of possible target addresses is determined for each FWB and LCTR. The set of target addresses is determined in order to insure that all loops within the instruction stream terminate, while providing a reasonably large set of potential addresses from which the final selections may be made.

Once a set of potential target addresses is determined for each FWB and LCTR, step 104, a target address is randomly selected for each FWB and LCTR from the corresponding set of potential target addresses, step 106. As previously described, a set of potential branch targets is determined for each FWB and LCTR, step 104. These potential branch targets are determined in accordance with a set of rules per preferred embodiments of the present invention. The target set determination rules insure that specific branch targets may be randomly selected from the set of potential targets, without creating infinite loops, and without further consideration of interactions between branch instructions. In other words, once the set of potential branch targets is determined for a specific branch instruction, a branch target may be randomly selected for the specific branch instruction, from the set of potential branch targets, without considering the specific branch targets selected for any other branch instruction. Upon selection of these target addresses, the instruction stream is guaranteed free of non-terminating loops, and may be executed without further analysis or modifications.

Figure 2A:
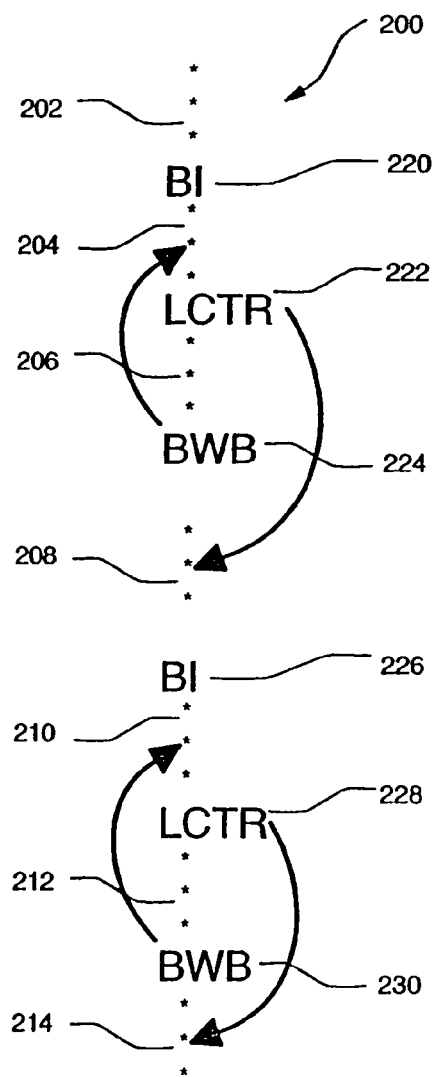
FIG. 2A illustrates an exemplary terminating instruction stream including backward branching instructions, per an embodiment of the present invention.

FIG. 2A illustrates an exemplary instruction stream with all branch targets resolved, per an embodiment of the present invention. As previously noted, each BWB may potentially form a loop, which may (i.e., a controlled loop) or may not (i.e., an uncontrolled loop) terminate. To insure that each loop terminates, regardless of the form of the BWB that created the loop, the methods of the present invention construct an instruction stream that includes appropriate loop components for each BWB. In particular, the methods of the present invention insure that each loop is properly initialized through an appropriate branch initialization (BI) instruction. Furthermore, preferred embodiments of the present invention insert within each loop a loop control instruction (LCTR), such as, for example, a branch on index or an unconditional branch preceded by a branch on count instruction. Under certain limited circumstances, such as the circumstances discussed herein with reference to FIG. 6, a terminating loop may be formed without insertion of an LCTR. In the most general circumstances, however, an LCTR instruction is required to insure loop termination. Each LCTR is a forward branching instruction, which can only be executed a finite number of times before a forward branch is executed. The branch target of each LCTR is selected in a manner that insures termination of at least the innermost loop within which the LCTR is located. By thus including an LCTR within a loop, the loop can only execute a finite number of times, bounded by (at most) the LCTR instruction. The loop termination condition is therefore a combination of the LCTR and BWB instructions: the loop terminates once the exit criteria of either the LCTR or BWB instruction is met. In this manner, an instruction stream containing loops formed by BWBs such as branch on condition may be formed, which would normally be considered uncontrolled loops, and these loops are thereby guaranteed to terminate.

Figure 2B:
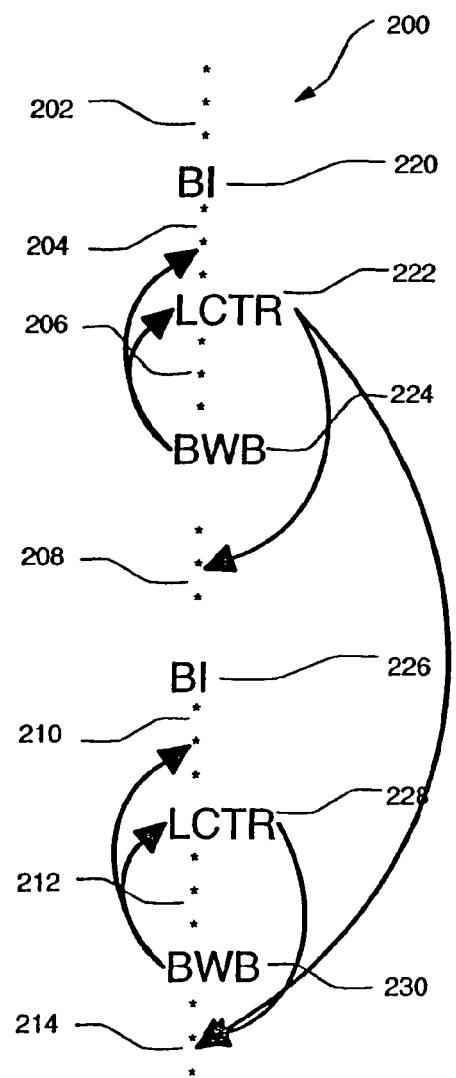
FIG. 2B illustrates the instruction stream of FIG. 2A, showing all possible branch targets for forward and backward branching instructions, per an embodiment of the present invention.

Exemplary instruction stream 200 of FIG. 2A illustrates the basic features of an instruction stream generated in accordance with the teachings of the present invention, after all branch targets have been resolved (i.e., after completion of step 106 in FIG. 1). Instruction stream 200 may begin with one or more random instructions, such as instruction set 202, which are unrelated to the formation or control of loops. Alternatively, instruction set 202 may be omitted entirely. In order to enable inclusion of a backward branching instruction, such as BWB 224, the methods of the present invention first insure that appropriate loop initialization and control instructions are placed in the instruction stream. In particular, the loop formed by BWB 224 is initialized by BI 220. A series of random instructions, such as instruction set 204, may be inserted into the stream subsequent to BI 220. Alternatively, instruction set 204 may be omitted entirely. In exemplary instruction stream 200, optional instruction set 204 constitutes a set of potential branch targets for BWB 224. Once BI 220 and (optionally) instruction set 204 are inserted into stream 200, the methods of the present invention provide for the inclusion of a loop control instruction, such as LCTR 222, within instruction stream 200. LCTR 222 also constitutes a potential branch target for BWB 224. During step 102 of FIG. 1, the branch target of forward branching instructions such as LCTR 222 remain unresolved. After inserting LCTR 222 into instruction stream 200, another set of random instructions may be inserted into stream 200, such as instruction set 206. Alternatively, instruction set 206 may be omitted entirely. After BI 220, (optionally) instruction set 204, LCTR 222, and (optionally) instruction set 206 are inserted into instruction stream 200, a backward branching instruction such as BWB 224 may be inserted into instruction stream 200. The branch target of backward branching instructions, such as BWB 224, are resolved during step 102 of FIG. 1, since all of the information necessary to resolve the branch target is available at the time BWB 224 is inserted into stream 200. In exemplary instruction stream 200, for example, BWB 224 may branch to any one of the one or more instructions within instruction set 204, or BWB 224 may branch to LCTR 222, as illustrated in FIG. 2B. In other words, BWB 224 may branch to any instruction following BI 220, up to and including LCTR 222. In exemplary instruction stream 200, an optional series of random instructions 208 follows BWB 224. Instructions 208 may be followed by a subsequent loop, as illustrated in exemplary instruction stream 200: BI 226, optional random instructions 210, LCTR 228, optional random instruction set 212, and BWB 230. As illustrated, additional random instructions such as 214 may be included after the second loop. Alternatively, instruction set 214 may be omitted entirely.

At the conclusion of step 102 of FIG. 1, instruction stream 200 is partially completed: branch targets for LCTRs 222 and 228 remain unresolved. LCTR branch targets are resolved during step 104 of FIG. 1, as described herein. In exemplary instruction stream 200 illustrated in FIG. 2A, LCTR 222 branches to an instruction within random instruction set 208. LCTR 222 therefore branches to an instruction subsequent to BWB 224, the backward branching instruction forming the loop within which LCTR 222 is located, thereby guaranteeing termination of the loop formed by BWB 224. As noted previously, the loop formed by BWB 224 is now terminated when the exit condition of either BWB 224 or LCTR 222 is met. Similarly, LCTR 228 branches to an instruction within random instruction set 214. LCTR 228 therefore branches to an instruction subsequent to BWB 230, the backward branching instruction forming the loop within which LCTR 228 is located, thereby guaranteeing termination of the loop formed by BWB 228. LCTR 222 does not branch to any point within the loop formed by BWB 230 (i.e., from BI 226 to BWB 230, inclusive).

In preferred embodiments of the present invention, the methods used to impose loop termination structure on the otherwise random instruction stream provide for a great degree of randomness, within the imposed structure. This is accomplished in two ways. First, the methods of the present invention provide a mechanism for including random streams of instructions between each of the loop control components, while insuring that appropriate loop control components are inserted into the stream to guarantee loop termination. Second, the methods of the present invention provide a set of potential branch targets for each backward branching (BWB), forward branching (FWB), and loop control (LCTR) instruction, then randomly select the branch target for each FWB and LCTR from the set of potential branch targets. BWB targets are resolved as the BWBs are inserted into the instruction stream (i.e., during step 102 of FIG. 1). FWB and LCTR targets are resolved after the entire initial instruction stream is generated, during steps 104 and 106 of FIG. 1.

The methods of the present invention provide a degree of randomness, by providing a mechanism for including random streams of instructions between each of the loop control components. As illustrated in FIG. 2A, a set of random instructions may be inserted between each loop control component (BI, LCTR, or BWB). Instruction sets between an LCTR and the next BWB, such as instruction sets 206 and 212, are optional and may be omitted entirely. Similarly, instruction sets between a BI and the next LCTR, such as instruction sets 204 and 210, are also optional and may be omitted entirely. In general, the methods of the present invention insert a random stream of instructions between each loop component (BI, LCTR, or BWB). For example, an LCTR such as LCTR 222, for example, can be placed in several different locations within stream 200, due to the presence of random instruction sets 204 and 206. In particular, LCTR 222 could be placed anywhere within the range between BI 220 and BWB 224. In this manner, the methods of the present invention do not require placing a BWB immediately after a corresponding LCTR. Forcing a BWB to follow immediately after a corresponding LCTR may heavily undermine the efficiency of testing: the possibility of allowing other instructions to precede the BWB is eliminated; and pipelining is affected, since the stream would contain sequences of branching instructions within each loop.

The methods of the present invention provide a degree of randomness by providing a set of potential branch targets for each branching instruction, and a mechanism to randomly select each branch target from the set of potential branch targets. FIG. 2B illustrates exemplary instruction stream 200, and the set of potential branch targets for each branch instruction. The methods of the present invention provide a set of rules through which a set of available branch targets is determined for each type of branch instruction: BWB, LCTR, and FWB. Each set of rules is discussed herein.

In general, all branch instructions follow a basic rule with respect to branch targets: the target address of any branch instruction (BWB, LCTR, or FWB) must point to the start of a single instruction. A branch target therefore cannot point to the middle of an instruction, such as might be the case with a multi-byte instruction.

In preferred embodiments of the present invention, BWB targets are resolved in a manner that insures loop termination, while providing a degree of randomness. As previously noted, BWB branch targets are resolved during step 102, as the BWB instruction is inserted into the instruction stream. The BWB targets are resolved by randomly selecting one branch target from among a set of potential branch targets. The set of potential branch targets is determined for each BWB instruction, in accordance with two rules. First, a BWB can branch to any instruction between the BI and LCTR that correspond to the BWB, subject to the second rule. In evaluating the set of potential branch targets according to the first rule, the corresponding LCTR is included within the set of potential branch targets, however the corresponding BI is not. Second, a BWB cannot branch into a loop that has already been closed, such as a loop nested within the loop formed by the BWB whose target address is being determined and the corresponding BI. In general, a BI marks the starting point (or opening) of a loop, and a BWB marks the end point (or closure) of a loop. As instructions are inserted into the instruction stream, each BI "opens" a loop, and each BWB "closes" a loop. BWBs "close" loops on a last-opened-first-closed basis. Correspondence between a BI and BWB is determined as follows: a BWB corresponds to the most recently inserted BI that has not yet been closed by a BWB. Correspondence between a BWB and LCTR is determined as follows: a BWB corresponds to the most recently inserted LCTR. The rules determining the set of targets for each BWB may alternatively be stated using these definitions: a BWB can branch to any instruction between the most recently inserted BI that has not yet been closed by a BWB, and the most recently inserted LCTR, excluding any instructions within loops closed by another BWB, and including the most recently inserted LCTR.

Figure 3A:
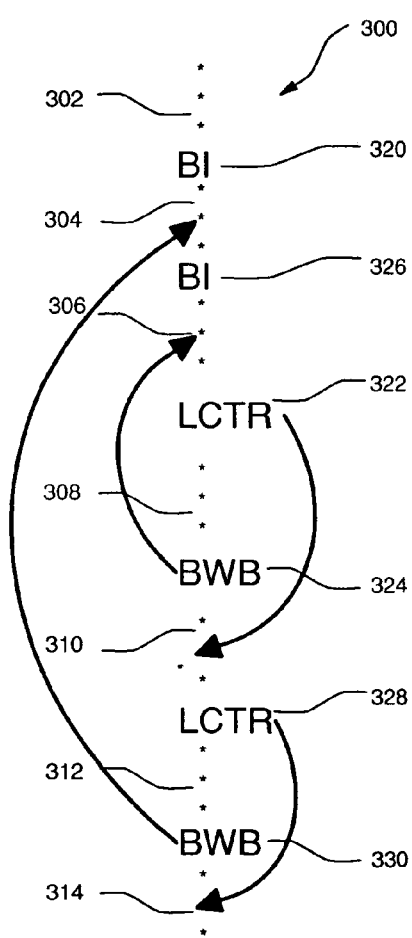
FIG. 3A illustrates an exemplary terminating instruction stream including backward branching instructions forming nested loops, per an embodiment of the present invention.
Figure 3B:
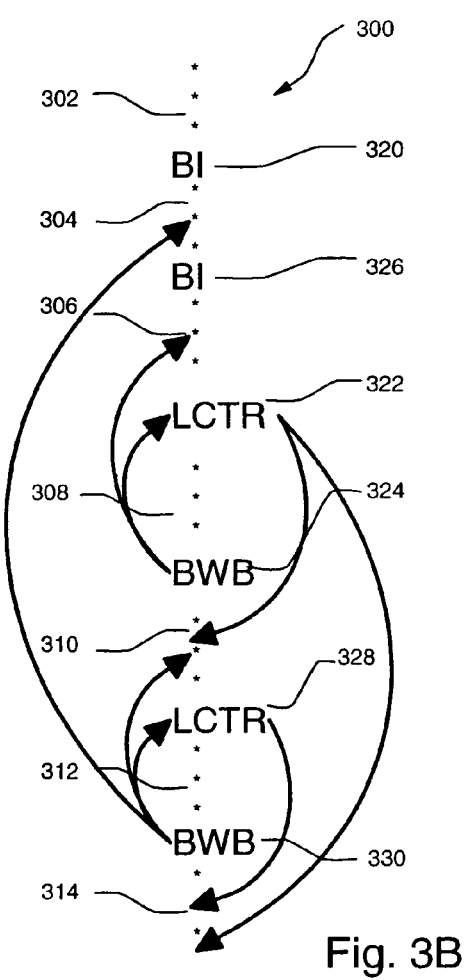
FIG. 3B illustrates the instruction stream of FIG. 3A, showing all possible branch targets for forward and backward branching instructions, per an embodiment of the present invention.

Operation of the BWB target rules may be illustrated with reference to FIGS. 2 and 3. FIGS. 2A and 3A illustrate exemplary instruction streams 200 and 300, respectively, after resolution of all branch targets. FIGS. 2B and 3B illustrate exemplary instruction streams 200 and 300, respectively, showing possible branch targets for BWB and LCTR instructions. Exemplary instruction stream 200 illustrates a case where a first loop is closed before a second loop is opened, exemplary instruction stream 300 illustrates a case where two loops are opened before any loops are closed. Instruction streams 200 and 300 are exemplary in nature, and are not intended in any way to limit the scope of the present invention to instruction streams having these precise features. Many variations on, and combinations of, these examples may be generated by employing the methods of the present invention; such variations and combinations are therefore within the spirit and scope of the present invention.

With reference now to FIG. 2, the BWB rules are illustrated. As previously discussed, BWB 224 is inserted into instruction stream 200 only after BI 200 and LCTR 222 have been inserted into stream 200. When BWB 224 is inserted, the most recently inserted BI that has not yet been closed by a BWB is BI 220: BI 220 therefore corresponds to BWB 224. Similarly, the most recently inserted LCTR is LCTR 222: LCTR 222 therefore corresponds to BWB 224. Within the range of instructions between BWB 224 and the corresponding BI, namely BI 220, there are no closed loops which would be excluded by the second rule. The branch target for BWB 224 may therefore be any instruction between BI 220 and LCTR 222, including LCTR 222. Note that, at the time BWB 224 is inserted into stream 200, all information needed to resolve the BWB target is available—BWB targets may therefore be resolved when the BWB is inserted into stream 200. Once the set of possible branch targets (here, random instruction set 204 and LCTR 222) is determined, one instruction within the set is selected as the branch target, and the fully resolved instruction is inserted into stream 200. Insertion of BWB 224 "closes" the loop initiated by BI 220, the most recently "opened" loop. Similarly, when BWB 230 is inserted into stream 200, the most recently inserted BI that has not yet been closed by a BWB is BI 226: BI 226 therefore corresponds to BWB 230. Finally, the most recently inserted LCTR is LCTR 228, which therefore corresponds to BWB 230. Within the range of instructions between BWB 230 and the corresponding BI, namely BI 226, there are no closed loops which would be excluded by the second rule. The branch target for BWB 230 may therefore be any instruction between BI 226 and LCTR 228, including LCTR 228: the set of potential branch targets for BWB 230 is therefore instruction set 210, and LCTR 228. An instruction from this set is then randomly selected, and the resolved BWB 230 is inserted into stream 200. As FIG. 2B illustrates, these are the only available branch target locations for these backward branching instructions.

With reference now to FIG. 3, further aspects of the BWB target rules are illustrated. In particular, FIG. 3 depict an instruction stream 300 having a nested loop, providing an opportunity to illustrate the operation of the second BWB rule. When BWB 324 is inserted into stream 300, two loops are open: the first is opened by BI 320, the second is opened by BI 326. Since loops are closed in a last-opened-first-closed order, BWB 324 must close the loop opened by BI 326, the most recently added and still open BI . BI 326 therefore corresponds to BWB 324. As previously discussed, LCTR 322 corresponds to BWB 324. The branch target for BWB 324 may therefore be any instruction between BI 326 and LCTR 322 (including LCTR 322), or instruction set 306 plus LCTR 322, in this example. The potential branch targets for BWB 330, however, provide a greater variety of options. When BWB 330 is inserted into stream 300, the most recently inserted but still open BI is BI 320, which therefore corresponds to BWB 330. LCTR 328 is the most recently inserted LCTR, and therefore corresponds to BWB 330. According to the first rule, the branch target for BWB 330 may, therefore, potentially be any instruction between BI 320 and LCTR 328, including LCTR 328: in this example, this includes any instruction within random instruction sets 304, 306, 308, and 310, as well as BI 326, LCTR 322, BWB 324, and LCTR 328. Application of the second rule, however, may in general eliminate targets identified by the first rule. According to the second rule, the branch target for BWB 330 cannot be within a loop previously closed by another BWB. In instruction stream 300 of FIG. 3, within the loop formed by BWB 330 and the corresponding BI (BI 320), a nested loop is formed by BI 326 and BWB 324. This loop is "opened" when BI 326 is inserted into instruction stream 300, and "closed" when BWB 324 is inserted into instruction stream 300. The BI 326 to BWB 324 loop is therefore "closed" at the time BWB 330 is inserted into stream 300, and by operation of the second rule all instructions within the range BI 326 to BWB 324 (inclusive of both) are excluded from the set of potential branch targets for BWB 330. The final (i.e., after application of both BWB target rules) set of potential branch targets for BWB 330 is, therefore: instruction set 304, instruction set 310, and LCTR 328.

A feature of the BWB target rules of the present invention is the possibility of providing multiple branch paths to particular instruction set. For example, as illustrated in FIG. 3B, the methods of the present invention allow for the possibility of providing three entry paths into random instruction set 306, while insuring termination of all program loops: a first path through initial execution of instruction set 304 and BI 326, a second path through a branch from BWB 324 to instruction set 306, and a third path through a branch from BWB 330 to instruction set 304 proceeding to BI 326.

In preferred embodiments of the present invention, LCTR targets are resolved in a manner that insures loop termination, while providing a degree of randomness. As previously noted, LCTR branch targets are resolved during steps 104 and 106, after the initial instruction stream is available. The LCTR targets are resolved by randomly selecting one branch target from among a set of potential branch targets. The set of potential branch targets is determined for each LCTR instruction, in accordance with a set of rules. In particular, if an LCTR results in skipping the execution of a subsequent BI or LCTR, the loop may become uncontrolled. It is, therefore, important to determine appropriate targets for the LCTR instructions to prevent the creation of uncontrolled loops.

The set of potential target addresses for each LCTR is determined in accordance with three rules, in addition to the basic branching rule. First, each LCTR must terminate at least the innermost loop that includes the LCTR. In other words, each LCTR must branch to an instruction that is at least one instruction beyond the next BWB in sequence (i.e., the BWB corresponding to the LCTR). Second, if an LCTR branches to an address that results in skipping a subsequent LCTR, then the branch must also terminate execution of the BWB corresponding to the skipped LCTR. Third, LCTR of loop L1 should not branch to a location within loop L2, unless loop L1 is nested within loop L2.

Operation of the LCTR branch target rules is illustrated with reference to FIGS. 2B and 3B. For illustrative purposes, the set of potential branch targets for LCTR 222 is determined first. In practice, the set of branch targets for LCTRs may be determined in any order, or in parallel. Applying the first rule, LCTR 222 must terminate the innermost loop including LCTR 222: LCTR 222 must branch to at least one instruction beyond BWB 224, which in this example corresponds to instruction set 208. Applying the third rule next, LCTR 222 should not cause a branch into the loop corresponding to BI 226 and BWB 230, since the loop containing LCTR 222 is not nested within the loop corresponding to BI 226 and BWB 230. Finally, if an FWB or an LCTR branches to an instruction that results in skipping LCTR 228, then the FWB or LCTR must also terminate execution of the BWB corresponding to LCTR 228, which in this example is BWB 230. Therefore, the set of potential branch targets for LCTR 222 consists of instruction sets 208 and 214, as illustrated in FIG. 2B. The set of potential branch targets for LCTR 228 is determined by applying the first rule: LCTR 228 must branch to an instruction beyond BWB 230, in this example the set of branch targets for LCTR 228 is therefore instruction set 214. In a similar fashion, the LCTR rules may be applied to exemplary instruction stream 300, resulting in the potential LCTR branch locations illustrated in FIG. 3B. Specifically, the set of potential branch targets for LCTR 322 consists of instruction sets 310 and 314; the set of potential branch targets for LCTR 328 consists of instruction set 314.

In addition to branching instructions inserted into an instruction stream in order to control loops, preferred embodiments of the present invention also take into account randomly inserted forward branching instructions (FWBs). These instructions are optional, and may be randomly inserted into the instruction stream during stream generation. While these instructions are not required for loop control, FWBs could undermine the intended loop control structure of BI, LCTR, and BWB instructions, thereby rendering one or more loops uncontrolled. To prevent this, preferred embodiments of the present invention also resolve FWB target addresses during steps 104 and 106, using the second and third LCTR rules. In other words, if a FWB branches to an address that results in skipping a subsequent LCTR, then the branch must also terminate execution of the BWB corresponding to the skipped LCTR. A FWB within loop L1 should not branch to a location within loop L2, unless loop L1 is nested within loop L2. For example, assume exemplary instruction stream 300 of FIG. 3 includes a FWB within random instruction set 304, for which a set of potential branch targets is to be determined. Applying the first rule, the following branch targets are eliminated: instruction set 308, BWB 324, instruction set 312, and BWB 330. Applying the second rule, the following branch targets are eliminated: instruction set 306, LCTR 322, instruction set 308, and BWB 324. The remaining instructions form the set of potential branch targets: instruction set 304, BI 326, instruction set 310, LCTR 328, and instruction set 314.

Figure 4:
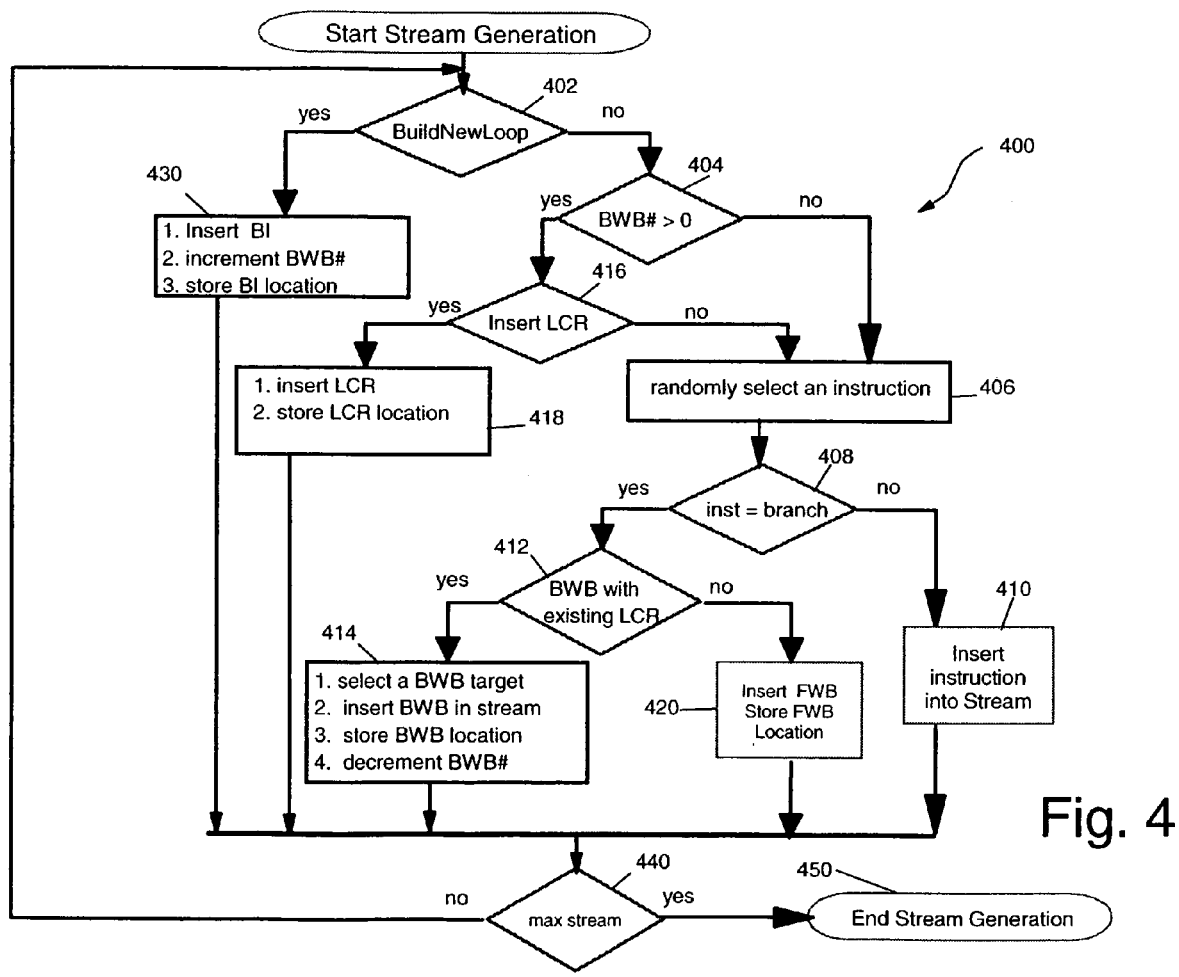
FIG. 4 illustrates details of a method to generate an initial instruction stream, per an embodiment of the present invention.

FIG. 4 illustrates additional details of process 400, which may be used to generate an initial instruction stream, step 102 of FIG. 1, per an embodiment of the present invention. At step 402, a random determination is made whether or not to start a new loop while assuring that the last LCTR inserted into the instruction stream (if any) has a corresponding BWB. The random instructions between a LCTR and the corresponding BWB should not include BI or LCTR instructions. Two conditions are therefore tested to determine whether a new loop is started, step 402: whether an LCTR has been inserted into the instruction stream for which no BWB has yet been inserted, and a random variable. As previously noted in the discussion of FIG. 2A, an instruction stream generated in accordance with the teachings of the present invention may start with a set of random instructions unrelated to loop control, or an instruction stream may start with a BI instruction. If a new loop is not to be started, processing continues at step 404. At step 404, variable BWB# is compared to zero: if BWB# is greater than zero processing continues at step 416, otherwise BWB# equals zero and processing continues at step 406. Variable BWB# is used to keep track of the number of open loops in a partially generated instruction stream. BWB# can also be used to identify correspondence between loop components (BI, LCTR, and BWB instructions). When BWB# equals zero, there are no open loops, and therefore LCTR and BWB instructions are not added to the stream. When BWB# equals zero, processing continues at step 406, where a random instruction is selected. In preferred embodiments of the present invention, step 406 prevents random selection of a BWB instruction, unless a corresponding LCTR has been inserted into the instruction stream. The instruction randomly selected in step 406 is then tested to determine if it is a branch instruction, step 408. If the instruction is not a branch instruction, the instruction is inserted into the instruction stream, step 410. If step 408 determines that the instruction randomly selected in step 406 is a branch instruction, processing continues at step 412 to determine if the branch instruction is a backward branch (BWB), with an existing LCTR to which the BWB could correspond. Assuming, for illustrative purposes, that BWB# equals zero, there are no open loops in the stream, therefore step 412 evaluates to "NO" and processing continues at step 420. Since, during step 406, random selection of a BWB is prevented unless the instruction stream contains an LCTR to which the BWB could correspond, when step 412 evaluates to "NO" the branch instruction is a FWB. The unresolved FWB is inserted into the stream, step 420, and the location of the unresolved FWB is stored in some manner for subsequent processing. Processing then continues at step 440. At step 440, the current number of instructions in the stream is compared to a threshold, to determine if additional instructions are to be added. If the threshold has not been met, additional instructions are to be added, and processing continues at step 402.

At some point during instruction stream generation, a random determination is made to start a new loop, step 402. Processing continues at step 430, where a branch initializing (BI) instruction is added to the stream. The location of the newly added BI is stored in some manner, for subsequent use in resolving LCTR and FWB branch locations during step 104 of FIG. 1. Also during step 430, BWB# is incremented, indicating that an additional loop has been opened. For illustrative purposes, the following discussion assumes that BWB# now equals one, indicating that a single loop is open. Processing continues at step 440, where the number of instructions is compared to a threshold. If the threshold has not been met, additional instructions are to be added, and processing continues at step 402.

Once at least one loop has been opened (i.e., BWB# is greater than zero), additional random instructions may be inserted into the instruction stream before the next loop control component (i.e., an LCTR instruction) is added to the instruction stream. During this period (i.e., a loop has been opened but no LCTR inserted), the method of the present invention prevents insertion of a BWB. For illustrative purposes, it is assumed that BWB# currently equals one, indicating that a BI has been inserted into the stream (opening a loop), and no corresponding LCTR has been inserted. A random determination is made, step 402, whether or not to open another loop. For illustrative purposes, it is assumed that a new loop is not to be opened, and processing continues at step 404. Since BWB# now equals one, step 404 determines that BWB# is greater than zero, and processing continues at step 416. At step 416, a random determination is made whether or not to insert an LCTR instruction into the stream. If an LCTR is not to be inserted at this time, processing continues at step 406, where a random instruction is selected for insertion into the stream. Processing continues at step 408, where the randomly selected instruction is checked to determine if it is a branch instruction. If not, processing continues at step 410, where the randomly selected instruction is inserted into the stream. If step 408 determines that the randomly selected instruction is a branch instruction, the instruction is then checked to determine if it is a BWB with a corresponding LCTR, step 412. For illustrative purposes, it is assumed that BWB# equals one (i.e., one loop is open), but an LCTR has yet to be inserted into the stream. Step 412 therefore evaluates to "NO" and a branch instruction is included in the FWB list, step 422. Processing then continues at step 440.

Once at least one loop has been opened (i.e., BWB# is greater than zero), additional loop components (LCTRs, followed by BWBs) may be added to the instruction stream. The example presented herein illustrates insertion of an LCTR and BWB into a partially generated instruction stream containing one open loop. For illustrative purposes, therefore, it is assumed that BWB# currently equals one. A random determination is made, step 402, whether or not to open another loop. For illustrative purposes, it is assumed that a new loop is not to be opened, and processing continues at step 404. Since BWB# equals one, step 404 determines that BWB# is greater than zero, and processing continues at step 416. At step 416, a random determination is made whether or not to insert an LCTR instruction into the stream while assuring that the last LCTR (if any) has been matched with a corresponding BWB. Two conditions are therefore tested to determine if an LCTR is to be added to the stream, step 416: that each LCTR in the stream has a corresponding BWB, and a random variable. If an LCTR is to be inserted into the stream, processing continues at step 418. In step 418, an LCTR is inserted into the stream, and its location within the stream is stored for subsequent use during step 104 of FIG. 1. Processing continues at step 440, where the number of instructions is compared to a threshold. For illustrative purposes, it is assumed that the threshold is not reached. Processing therefore continues at step 402, where for illustrative purposes it is again determined that a new loop is not to be opened. Processing continues at step 404, where BWB# is again compared to zero: since BWB# is still equal to one, processing continues at step 416. At step 416, a determination is again made as to whether an LCTR is to be inserted into the stream. When, as in the present example, an LCTR has been inserted into the stream for which no corresponding BWB has been inserted, step 416 evaluates to "NO" regardless of the value of the random variable. No LCTR is inserted, and processing continues at step 406. A random instruction is then selected for insertion into the stream, step 406. Processing continues at step 408, where the randomly selected instruction is tested to determine if it is a branching instruction. The random instruction may be a non-branching instruction, in which case processing continues at step 410 as previously described, and the instruction is inserted into the stream. Alternatively, the randomly selected instruction may be a branching instruction, in which case processing continues at step 412. Step 412 determines whether the randomly selected instruction is a BWB with an available LCTR. If, for example, the randomly selected instruction is a forward branching (FWB) instruction, step 412 evaluates to "no" and processing continues at step 420, where it is determined that the randomly selected branching instruction is a FWB which is then inserted into the stream, step 422. If, however, the randomly selected instruction is a backward branching (BWB) instruction, step 412 now evaluates to "yes," since an available LCTR has been inserted into the stream, step 418. Processing then continues at step 414, where: a branch target is selected for the randomly selected BWB; the resolved BWB is inserted into the stream; the location of the BWB within the stream is stored for subsequent use; and BWB# is decremented, indicating that a loop has been closed. Processing now continues at step 440, where the number of instructions in the stream is compared to a threshold. If the threshold is met or exceeded, initial stream generation ends. Step 102 of FIG. 1 is now complete, and processing continues with step 104 of FIG. 1.

As previously noted, FIG. 4 illustrates processing details of step 102 of FIG. 1, per an embodiment of the present invention. Upon completion of the steps illustrated in FIG. 4, therefore, step 102 is complete: an initial instruction stream is available for final processing. Also as previously noted, the instruction stream produced in step 102 includes forward branching instructions (FWB) and loop control instructions (LCTR) for which branch targets have not yet been determined. A set of potential branch targets is determined, step 104, in accordance with the rules described herein for LCTR and FWB branch target determination. Once the potential targets are determined, step 104, one target is randomly selected for each forward branching instruction, step 106, from the set of potential branching targets available for each forward branching instruction as determined in step 104.

EXAMPLES

The methods and teachings of the present invention may be implemented in a variety of ways. In particular, a variety of embodiments are envisioned with which to implement the method steps illustrated in FIG. 1, and are therefore within the spirit and scope of the present invention. In addition to the exemplary embodiment previously described, two additional exemplary embodiments are presented herein.

In one exemplary embodiment, a method similar to the method illustrated in FIG. 4 is used to generate an initial instruction stream, step 102. Step 104 is performed by dividing the instruction space into a set of zones, and determining mathematical sets of instruction locations through which sets of available target addresses are determined. In another exemplary embodiment, step 102 is implemented using an instruction stacking method. Instruction stream mapping during step 102 stores the locations of loop components (BI, LCTR, and BWB) and optional, randomly inserted FWB instructions.

Loop Zones, Mathematical Sets

The stream generation algorithm below may be used to generate a random instruction stream, step 102 of FIG. 1, per an embodiment of the present invention. Information stored during this step, such as the locations of BI, LCTR, BWB, and FWB instructions within the stream, is used during subsequent processing to determine forward branching targets.

```
702 begin
704     while(StreamLength < MaxStream)
706         if (BuildLoop = ok) /* time to build new loop? */
708             select inst such that Type(inst) = BI; /* select a branch initializer */\\
710             nBWB = nBWB + 1;
712             BIs = Bis + Address(inst); /* save loop initializer location */
714             BeginLoopZone = BeginLoopZone + Address(i); /* Loop entry points */
716             if (DoneTargetZone=off) /* was building a target zone? */
718                 EndTargetZone = EndTargetZone + Address(i);
720                 DoneTargetZone = True;
722         else if (Rand(X2) AND (nBWB > 0) AND (ActiveLCTR = 0))
724             select inst such that Type(inst) = LCTR; /* select an LCTR */
726             LCTRs = LCTRs + Address(inst); /* save the LCTR location */
728             ActiveLCTR = on; /* prevent selection of new BI or LCTR */
730             if (DoneTargetZone = off)
732                 EndTargetZone = EndTargetZone + Address(inst);
734                 DoneTargetZone = on;
736         else if (Rand(X3) AND (ActiveLCTR = off)) /* need to close a loop? */
738             choose inst such that Type(inst) = BR; /* BWB*/
740             choose valid TargetAddress(inst) from (BI(i), LCTR(inst)]);
742             nBWB = nBWB - 1;
744             DoneTargetZone = off;
746             ActiveLCTR = off; /* can select BI or LCTR */
748             BWBs = BWBs + Address(inst); /* save BWB location */
750         else
752             choose inst; /* pick up any instruction */
754             if (Type(inst) = BR) /* branching instruction is picked? */
756                 push (FWBs, Address(inst)); /* include it in the FWB list */
758             EnQueue(S) = inst; /* append instruction to the stream */
760         SetTargets( ); /* invoke target selecting algorithm */
762 end
```

The forward branching target address algorithm below may be used to determine the target addresses for all forward branching instructions: randomly inserted forward branch (FWB) and loop control (LCTR) instructions.

```
802 begin
804     EndLoopZone = BWBs;
806     while (|BeginLoopZone| > 0) /* Build loop zones */
808         let j = min(EndLoopZone) ;
810         let i = max(BeginLoopZone): j > i ;
812         BeginLoopZone = BeginLoopZone - i;
814         EndLoopZone = EndLoopZone - j;
816         LoopZones = LoopZones + (i,j) ;
818     while (|BWBs| > 0)     /* Build target zones */
820         let i = min (BWBs) ;
822         let j = min(EndTargetZone) ;
824         BWBs = BWBs - i;
826         EndTargetZone = EndTargetZone - j;
828         if (there is (a, b) in LoopZones: (a < i) AND (b > j))
830             LocalTargetZones = LocalTargetZones + (i,j) ;
832         else
834             TargetZones = TargetZones + (i,j) ;
836     while (IsEmpty(FWBs) = false) /* Find a target for each FWB */
838         j = pop (FWBs);
840         select inst: Address(inst) = j ;
842         ValidTargetZones = empty set ;
844         for all ((a,b) in LoopZones: (a < j < b)) /* all loops enclosing the FWB */
846             let (b, c) in LocalTargetZones; /* if there are local target zones */
848             ValidTargetZones =ValidTargetZones + (b, c) ;
850         for all ((a,b) in TargetZones: (a > j))
852             ValidTargetZones = ValidTargetZones + (a, b) ;
858         if (there is (d,e) in LoopZones: (d < j < e)) /* inner loop enclosing the FWB */
860             let m = Address(inst+1); /* Address of next instruction */
862             n = min(e, LCTR): LCTR > d ; /* closest of LCTR or BWB */
864             ValidTargetZones = ValidTargetZones + (m, n) ;
866         randomly choose (r, s) in ValidTargetZones: (r > j) ;
868         TargetAddress(inst) = RandRange(r,s);
870     while (|LCTRs| > 0) /* Find a target for each LCTR */
872         ValidTargetZones = empty set ;
874         select inst in LCTR: (j = Address(inst)) = min(LCTRs) ;
876         for all ((a,b) in LoopZones: (a < j < b))
```

-continued

```
878             let (b, c) in LocalTargetZones ;
880                 ValidTargetZones = ValidTargetZones in (b, c) ;
882             for all ((a,b) in TargetZones: (a > j))
884                 ValidTargetZones = ValidTargetZones in (a, b) ;
886             choose (d, e) in ValidTargetZones: (d > j) ;
888             TargetAddress(i) = RandRange(d,e);
890             LCTRs = LCTRs – i ;
892 end
```

The following variables and initial conditions are used in the preceding algorithms:

```
ActiveLCTR : LCRT without a matching BWB is present
Address(inst) : Address of instruction inst
LCTR : set of special instructions used for controlling loop iterations
BI : set of instructions used for initializing loop variables
BR : set of branching instructions
BWB : set of instructions with backward branching
EndTargetZone : set of addresses pointing to the end target zones
EndLoopZone : set of addresses pointing to the end loops
FWB : set of instructions with forward branching
LocalTargetZones : branch targets inclosed with a loop
LoopZones : set of pair of addresses indicating the begining and
  ending of loops
MaxStream : maximum allowed number of instructions
nBWB : number of backward branch instructions
S : instruction stream
StreamLength: the number of instructions in the stream
TargeAddress(inst): target address of instruction
TargetZones : sets of valid target address
Type(inst) : instruction type
Initial Values:
DoneTargetZone = True;
FWB = empty set;
ActiveLCTR = False;
LCTRs = empty set;
nBWBTargets = 0;
nBWB = 0;
nLCTR = 0;
nBI = 0;
S = empty set;
```

The method used in the zone/set embodiment divides the address space of the stream into different zones, classified as target zones and loop zones. A loop zone begins each time a BI is inserted into the stream. A loop zone ends each time a BWB is inserted into the stream. A BWB ends the loop started by the BI corresponding to the BWB. As previously discussed, a BWB corresponds to the most recently inserted BI that has not yet been closed by a BWB. When the stream contains nested loops, therefore, loop zones are ended on a last-opened-first-closed basis. After a BWB is included in the stream, a target zone starts. This target zone continues until the next BI or LCTR is inserted into the stream. In the case of nested loops, it is possible that a target zone may be enclosed within one or more loop zones. Such a target zone is referred to as a local target zone. All other target zones, which are not enclosed within a loop zone, are referred to as global target zones.

The target zones, local and global, determine the potential target addresses for the forward branching (FWB) and loop control (LCTR) instructions. The location of a FWB or LCTR instruction must be prior to the beginning of the target zone(s) for that instruction. A local target zone can include that target address of a FWB or LCTR only if the location of the FWB or LCTR is within the loop zone whose ending address begins the local target zone. These concepts may be illustrated by way of example.

Figure 5:
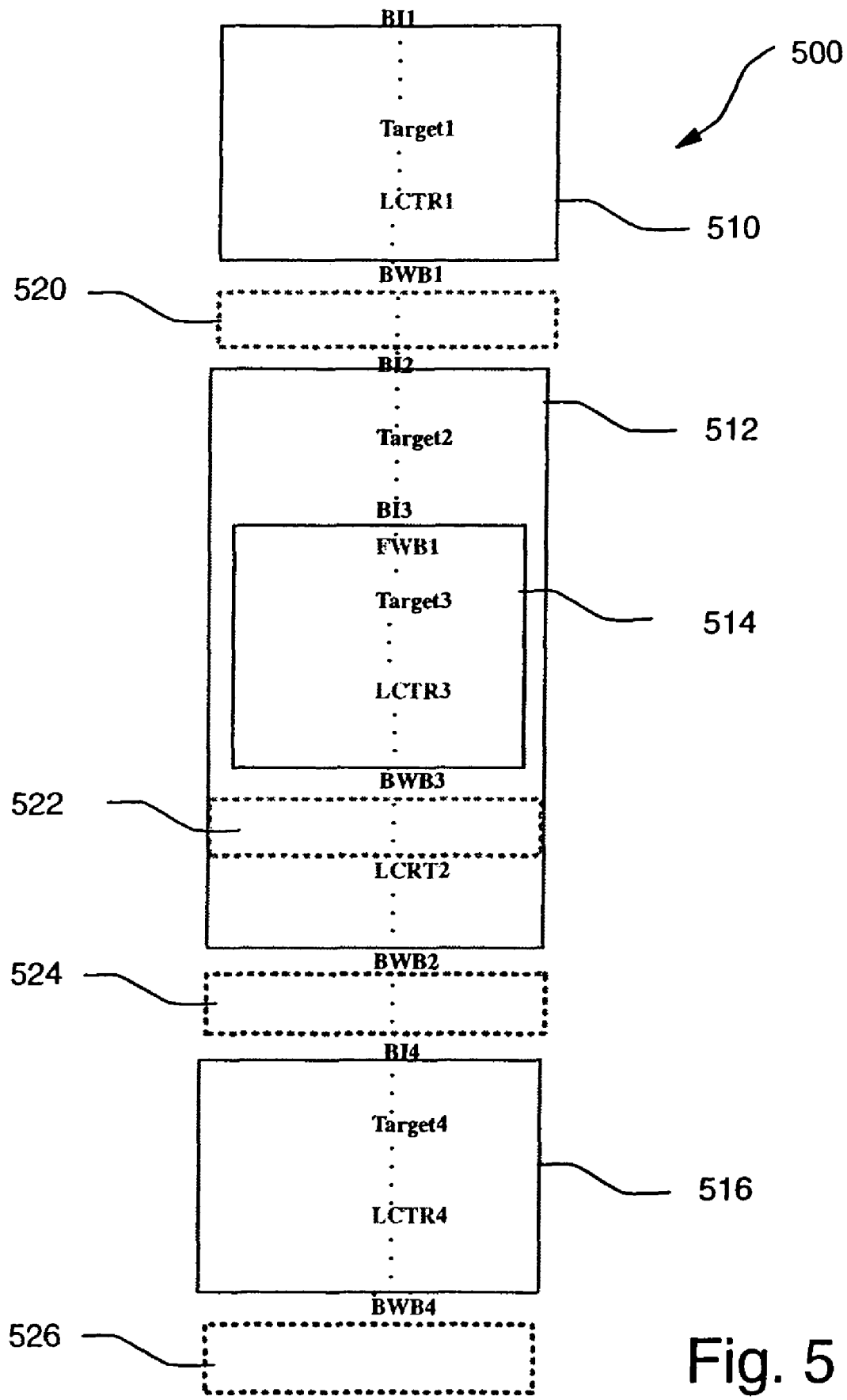
FIG. 5 illustrates an exemplary terminating instruction stream including backward branching instructions, depicting target and loop zones per an embodiment of the present invention.

The stream generation algorithm of the loop zone and mathematical set embodiment populates the mathematical sets of BIs, BWBs, and EndTargetZones. These sets are subsequently used by the forward branching target address algorithm. FIG. 5 illustrates an exemplary instruction stream, randomly generated according to the methods of the present invention. FIG. 5 further illustrates the various target and loop zones within the address space of the instruction stream. As previously discussed, the location of instructions within the stream, including the location of FWB and LCTR instructions, determines the valid target zones to which each FWB and LCTR instruction may branch.

With reference to FIG. 5, the various zones of exemplary instruction set 500 are described. Instruction BI_1 starts a loop, which is subsequently closed by the corresponding BWB instruction, BWB_1. Zone 510 is therefore a loop zone, extending from BI_1 to BWB_1. BWB_1 begins target zone 520, which is terminated by instruction BI_2. BI_2 begins another loop zone 512, which is terminated by the corresponding BWB instruction, BWB_2. BWB_2 begins target zone 524, which is terminated by BI_4. BI_4 begins loop zone 516, which is terminated by the corresponding BWB instruction, BWB_4. BWB_4 begins target zone 526, which is terminated by the end of stream 500. Within loop 512, BI_3 begins nested loop 514, which is terminated by the corresponding BWB instruction, BWB_3. BWB_3 begins target zone 522, which is terminated by LCTR_2. Note that target zone 522 is a local target zone, since it is enclosed within loop 512. All other target zones, 520, 524, and 526, are global target zones.

After the exemplary instruction stream of FIG. 5 is generated, the contents of the sets BI, BWB, and EndTargetZone are determined, as illustrated below. Here, $A(x)$ is the address of instruction x. A range of instructions, from address x to address y, inclusive of instructions x and y, is indicated by the notation $[A(x), A(y)]$. A range endpoint that is included in the range (inclusive endpoint) is identified by a square bracket '[' or ']'. Alternatively, a range endpoint that is excluded from the range is identified by a parenthesis '(' or ')'. A range of instructions, from instruction x to instruction y, exclusive of both instructions, is indicated by the notation $(A(x), A(y))$. A range of instructions, from address x to address y, inclusive of instruction x but exclusive of y, is indicated by the notation $[A(x), A(y))$.

$BI=\{A(BI\_1), A(BI\_2), A(BI\_3), A(BI\_4)\}$ $BWB=\{A(BWB\_1), A(BWB\_2), A(BWB\_3), A(BWB\_4)\}$ $EndTargetZone=\{A(BI\_2), A(LCTR\_2), A(BI\_4), A(EndStream)\}$ Based on these sets of locations, the target, local target, and loop zones are:

$TargetZones=\{(A(BWB\_1), A(BI\_2)], (A(BWB\_2), A(BI\_4)], (A(BWB\_4), A(End)]\}$ LocalTargetZones={(A(BWB_3), A(LCTR_2))}

LoopZones={(A(BI_1), A(BWB_1)], (A(BI_2),
    A(BWB_2)], (A(BI_3), A(BWB_3)], (A(BI_4),
    A(BWB_4)]}

Valid target zones for LCTRs can be determined based on the target zones illustrated in FIG. 5. For example, the valid target zones for LCTR_1 are zones 520, 524, and 526: LCTR_1 may therefore branch to any global target zone. The valid target zones for LCTR_2 are zones 524 and 526, all global target zones after LCTR_2. Valid target zones for LCTR_3 are zones 522, 524, and 526. Finally, the only valid target zone for LCTR_4 is zone 526. Valid target addresses for LCTR_1, LCTR_2, LCTR_3, and LCTR_4 instructions can be selected from these zones:

LCTR_1: {(A(BWB_1, A(BI_2)], (A(BWB_2),
    A(BI_4)], (A(BWB_4), A(End)]}

LCTR_2: {(A(BWB_2), A(BI_4)], [A(BWB_4),
    A(End)]}

LCTR_3: {(A(BWB_3), A(LCTR_2)], (A(BWB_
    2), A(BI_4)], (A(BWB_4), A(End)]}

LCTR_4: {(A(BWB_4), A(End)]}

The valid addresses for FWB targets are determined in a similar manner. The algorithm also allows the target of a FWB instruction to be between the instruction address and the next BI or LCTR instruction. For example, if a FWB is located within instruction stream 500, between Target_2 and BI_3, the FWB instruction could branch anywhere within the address space between the FWB and BI_3. The target address of the FWB located between Target_2 and BI_3 could also be selected from the following local and global target zones: zone 522 (since FWB is within loop 512), 524, and 526.

Instruction Stacking, Stream Mapping

Another exemplary embodiment of the present invention involves instruction stacking and stream mapping during step 102 of FIG. 1. Resolution of branch targets for forward branching (FWB) and loop control (LCTR) instructions is accomplished using the stream mapping data generated during step 102, in accordance with target rules previously described herein. In addition, the stacking algorithm provides a convenient mechanism with which to address instruction prerequisites.

Instruction stacking involves the use of an instruction stack, onto which instructions may be pushed during the test generation process. The use of a stack provides a convenient mechanism with which to accommodate instruction prerequisites in general, and more specifically, the prerequisites associated with loop control. For example, a BI may be considered a prerequisite of a backward branch. Another embodiment of a method for generating a random instruction stream in accordance with the teachings of the present invention involves placing an instruction and its prerequisites on an instruction stack, whenever the instruction having the prerequisites is randomly selected for inclusion within the instruction stream. Alternatively, the instruction having the prerequisites may be placed on the stack, and one or more of the prerequisites inserted into the instruction stream. In this manner, the appropriate control sequence is stacked, and may be popped a random number of instructions at a time. Between stack pops, additional random instructions may be directly inserted into the instruction stream, provided these instructions are unrelated to loop control, or have no prerequisites.

Stream mapping involves the use of an n×m matrix, associated with an instruction stream of length n instructions. The matrix width m is selected in accordance with the amount of pertinent information to be stored with respect to each instruction in the stream. In preferred embodiments, a 16-bit wide matrix is used to store information describing each instruction. Each bit in the matrix represents a flag, indicating the presence or absence of a specific property for a specific instruction. Other mapping alternatives are envisioned, within the spirit and scope of the present invention. For example, the number of bits used to map each instruction depends primarily on the number of properties to be identified: a matrix using more or less than 16 bits may be used. For the purposes of loop control, the following properties are flagged: start loop location (i.e., BI), end loop location (i.e., BWB), loop control (LCTR), or an unresolved branch (FWB or LCTR). During instruction stream generation (step 102 of FIG. 1), appropriate bits are set in the matrix entry corresponding to each instruction, as the instruction is added to the stream. In preferred embodiments, a bit is set (i.e., equal to '1') if a particular property is present, and is reset (i.e., zero) if the property is absent.

Figure 6:
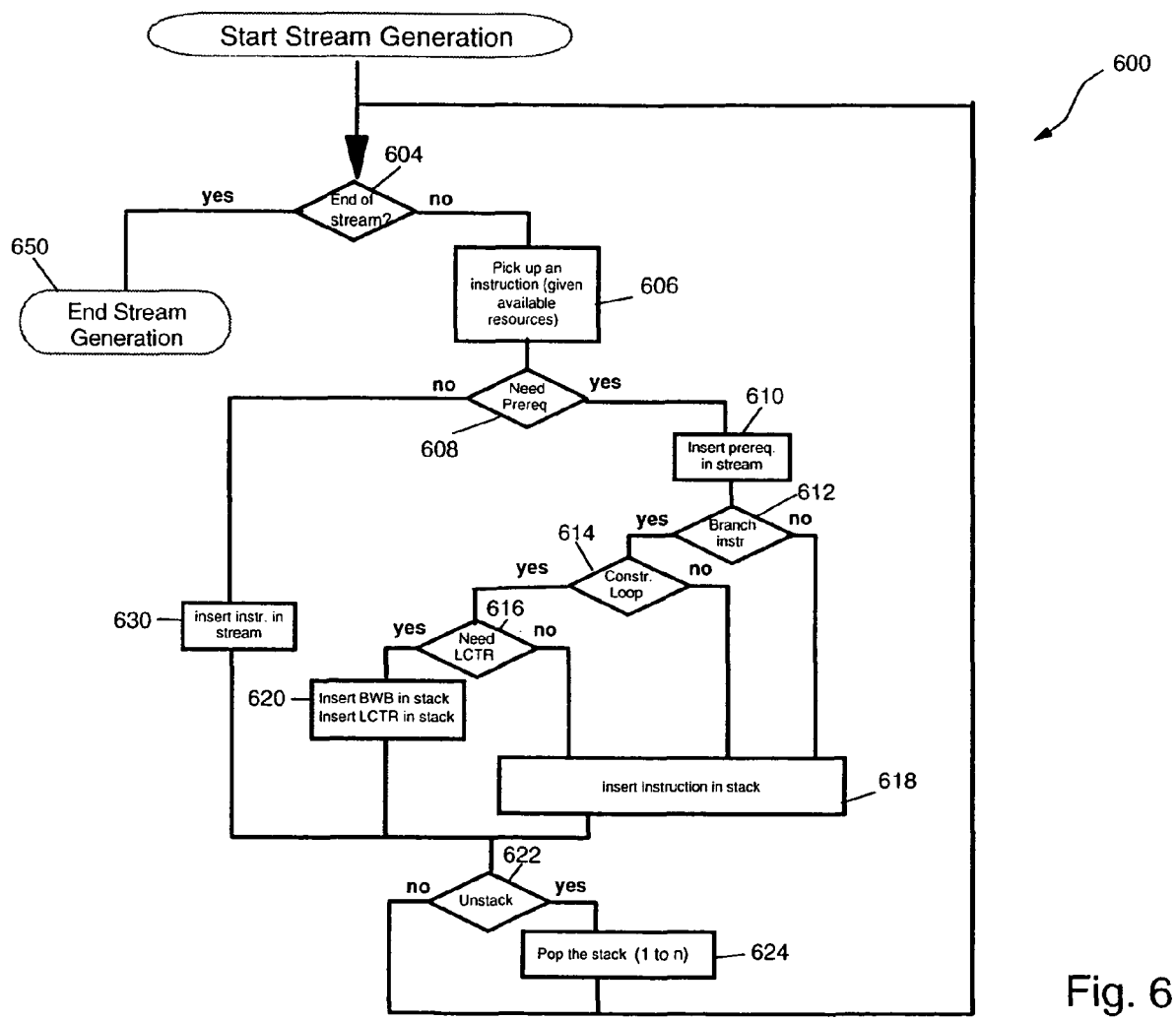
FIG. 6 illustrates an alternative method to generate an initial instruction stream, per an embodiment of the present invention.

With reference now to FIG. 6, process flow 600 per an exemplary embodiment of step 102 of FIG. 1 is illustrated, in which instruction stacking is employed. At step 604, a determination is made regarding whether the end stream has been reached: if the stream end has been reached, stream generation ends, step 650. If the stream end has not been reached, processing continues at step 606. In step 606, an instruction is randomly selected from the available instruction set. This instruction may or may not have prerequisites, and may or may not be related to loop formation and control.

The instruction randomly selected in step 606 may have prerequisites which are unrelated to loop formation and control, as determined in step 608. In general, the data in the registers and/or memory locations accessed by each instruction as well as the address space specified by the instruction should be within certain ranges, unless exception cases are being tested. Further, biasing may be used in generating specific test cases. During stream generation, therefore, all resources needed for the proper execution of a particular instruction should be provided, such as data and registers, for example. In general, this may involve the execution of one or more instructions before a specific instruction may be executed. If the execution of instruction A requires the prior execution of instruction B, B is a prerequisite of A. In order to maximize the degree of randomness in an instruction stream, however, it may be desirable to provide a mechanism to insert random instructions between an instruction and its prerequisite. In this manner, an instruction need not be immediately adjacent to its prerequisite(s). For example, load instructions are used to insert test case data into registers, to be used by subsequent instructions. These load instructions should be placed sufficiently far in advance of the instructions that will use the data in the registers, to insure data availability at execution time. In the intervening time, however, no other instruction may overwrite the loaded data: this data may be accessed on a read-only basis. The stacking method employed herein minimizes the effects of prerequisites on their subsequent instructions. If instruction A requires one or more prerequisites, as determined in step 608, the prerequisites are inserted into the stream, step 610, and instruction A is stacked after being evaluated for loop control conditions. Instruction A is subsequently popped after a random number of instructions are inserted into the stream. As previously discussed, a BI instruction may be considered a prerequisite of a BWB instruction: if the instruction selected in step 606 is a BWB, the prerequisite BI instruction is inserted into the instruction stream during step 610.

After inserting its prerequisites into the stream, step 610, the instruction selected in step 606 is tested to determine if it is a branch instruction, step 612. If not, the instruction is stacked, step 618. If the instruction selected in step 606 is determined to be a branch instruction, step 612, the instruction is next tested to determine whether it creates a loop (i.e., BWB) or not (FWB). If the instruction selected in step 606 does not create a loop, it is a FWB, and is inserted into the instruction stack, step 618. If the instruction selected in step 606 does construct a loop, as determined in step 614, processing continues at step 616 to determine if an LCTR is required. There are circumstances, described below, in which an LCTR may not be required even if a BWB is selected in step 606. If an LCTR is not required, as determined in step 616, the instruction is stacked, step 618. If an LCTR is required, the BWB instruction is first stacked, then the LCTR is stacked, since the instructions will be removed in last-in-first-out (LIFO) order, step 620.

Under certain conditions, an LCTR may not be required in order to guarantee loop termination, when an embodiment such as instruction stacking is used. For example, if the instruction randomly selected in step 606 is a backward branch on count, a branch instruction associated with controlled loops, it is possible to create a direct association between the backward branch on count and its associated BI instruction: the BI initializes the same variable tested and incremented by the branch on count. Under this set of circumstances, an LCTR is not required even though a BWB is added to the instruction stream. Such an arrangement is not generally possible, however, if the backward branching instruction is one that is normally associated with uncontrolled loops. In embodiments where a BI is inserted into the instruction stream before its associated BWB is selected, such as the embodiment illustrated in FIG. 4, the nature of the associated BWB is unknown when the BI is inserted into the stream. In such an embodiment, the most general case is provided for, and an LCTR is inserted into the stream even if the associated BWB is a branch on count instruction.

Alternatively, the instruction selected at step 606 may not require prerequisites, as determined in step 608. Processing then continues at step 630 where the instruction is inserted in the stream.

After instructions are stacked, step 618, a random determination is made whether or not to pop one or more instructions, step 622. If no instructions are to be popped, processing continues at step 604. If instructions are to be popped, step 622, a random number of instructions are selected to be removed from the stack (popped), and inserted into the stream, step 624. Processing then continues at step 604.

Once a sufficient number of instructions have been inserted into the stream, step 604 evaluates to "YES" and stream generation terminates. At this point, an initial instruction stream has been generated: step 102 of FIG. 1 is complete. Processing then continues with steps 104 and 106 of FIG. 1, to determine a set of target addresses for each forward branching instruction (FWB and LCTR), step 104, and randomly select a target from each set, step 106.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of generating a terminating instruction stream including test instruction streams, said method comprising:

generating a first instruction stream, said first instruction stream including at least one backward branching instruction and a plurality of loop components, each of said at least one backward branching instructions being preceded by one or more of said loop components such as to guarantee termination of said loop as appropriate, said loop components including;
one or more branch initialization instructions; and
one or more forward branching instructions;
determining a set of target addresses for each of said one or more forward branching instructions;
producing the terminating instruction stream from the first instruction stream, by selecting a target address from said set of target addresses for each of said one or more forward branching instructions.

2. The method of claim 1, wherein the terminating instruction stream includes a plurality of branch paths to at least one instruction set.

3. The method of claim 1, wherein the at least one backward branching instruction includes at least one instruction normally associated with uncontrolled loops.

4. The method of claim 3, wherein the at least one instruction normally associated with uncontrolled loops is selected from the group consisting of branch on condition, branch on index high, and branch on index low.

5. The method of claim 1, wherein a branch initialization instruction precedes one or more of said one or more forward branching instructions.

6. The method of claim 1, further comprising storing location information for each of said backward branching instructions, forward branching instructions, and branch initialization instructions.

7. The method of claim 6, wherein said storing is performed substantially concurrently with said generating.

8. The method of claim 6, wherein said storing comprises mapping loop initialization, loop control, and branching properties of an instruction into a data word corresponding to said instruction.

9. The method of claim 1, wherein said terminating stream includes at least one random forward branching instruction, said random forward branching instruction inserted for a purpose other than loop control.

10. The method of claim 1, wherein said generating further comprises inserting randomly selected instructions between loop control instructions.

11. The method of claim 10, wherein said inserting comprises instruction stacking.

12. The method of claim 11, wherein at least one backward branch instruction is directly associated with a branch initialization instruction, without an intervening forward branching instruction.

13. The method of claim 10, wherein said inserting comprises preventing randomly selected backward branch instructions from being inserted into the first stream, unless a corresponding forward branching instruction is in the first instruction stream.

14. The method of claim 1, wherein the terminating stream includes nested loops.

15. The method of claim 1, wherein said determining comprises identifying loop zones and target zones within said first instruction stream.

16. At least one program storage device readable by a machine, tangibly embodying at least one program of instructions executable by the machine to perform a method of generating a terminating instruction stream including at least one backward branching instruction such as to guarantee termination of said loop as appropriate, said method comprising:
- generating a first instruction stream, said first instruction stream including at least one backward branching instruction and a plurality of loop components, each of said at least one backward branching instructions being preceded by one or more of said loop components, said loop components including;
  - one or more branch initialization instructions; and
  - one or more forward branching instructions;
- determining a set of target addresses for each of said one or more forward branching instructions;
- producing the terminating instruction stream from the first instruction stream, by selecting a target address from said set of target addresses for each of said one or more forward branching instructions.

17. The at least one program storage device of claim 16, wherein the terminating instruction stream includes a plurality of branch paths to at least one instruction set.

18. The at least one program storage device of claim 16, wherein the at least one backward branching instruction includes at least one instruction normally associated with uncontrolled loops.

19. The at least one program storage device of claim 16, wherein a branch initialization instruction precedes one or more of said one or more forward branching instructions.

20. A data processing system for generating a terminating instruction stream including at least one backward branching instruction, said data processing system including a memory, said memory containing program code for performing the steps of:
- generating a first instruction stream, said first instruction stream including at least one backward branching instruction and a plurality of loop components, each of said at least one backward branching instructions being preceded by one or more of said loop components such as to guarantee termination of said loop as appropriate, said loop components including;
  - one or more branch initialization instructions; and
  - one or more forward branching instructions;
- determining a set of target addresses for each of said one or more forward branching instructions;
- producing the terminating instruction stream from the first instruction stream, by selecting a target address from said set of target addresses for each of said one or more forward branching instructions.

* * * * *